United States Patent [19]

Ohshima et al.

[11] 4,236,177
[45] Nov. 25, 1980

[54] BEAM SPLITTING PRISM ASSEMBLY WITH BIAS LIGHT SOURCE

[75] Inventors: Shigeru Ohshima; Takeshi Sekiguchi, both of Tokyo, Japan

[73] Assignee: Canon Kabushiki Kaisha, Tokyo, Japan

[21] Appl. No.: 1,928

[22] Filed: Jan. 8, 1979

[30] Foreign Application Priority Data

Jan. 17, 1978 [JP] Japan .................................. 53-3491
Feb. 3, 1978 [JP] Japan .................................. 53-11293

[51] Int. Cl.³ .............................................. H04N 9/09
[52] U.S. Cl. ...................................................... 358/55
[58] Field of Search ........................... 358/55; 350/173

[56] References Cited

U.S. PATENT DOCUMENTS 3,932,027  1/1976  Cook et al. ........................... 350/173
4,123,777  10/1978  Sekiguchi .............................. 358/55

*Primary Examiner*—John C. Martin
*Attorney, Agent, or Firm*—Fitzpatrick, Cella, Harper & Scinto

[57] ABSTRACT

A television camera comprising an objective lens, a color resolution prism system and image pick-up devices arranged to respectively face the exit faces of said color resolution prism system. Said color resolution prism system comprises first, second, third and fourth prisms arranged in the above-mentioned order from said objective lens and along the optical axis thereof, wherein said first and second prisms are mutually separated by an air gap, said second and third prisms are mutually separated by an air gap, said second prism is provided with a first dichroic layer on a surface thereof facing said third prism, and said third and fourth prisms are mutually adhered through a second dichroic layer.

1 Claim, 11 Drawing Figures

BEAM SPLITTING PRISM ASSEMBLY WITH BIAS LIGHT SOURCE

BACKGROUND OF THE INVENTION

1. Field of the Invention

The present invention relates to a television camera, and more particularly to a television camera provided with a color resolution prism system of a novel construction.

2. Description of the Prior Art

In a color television camera a color resolution prism system positioned behind the objective lens separates the image forming beam into the beams of three color components and focuses said beams on the surfaces of three image pick-up devices respectively corresponding to said three color components. Each image pick-up device scans the image pick-up surface to convert the image into electric signals.

For the above-mentioned purpose there are already proposed the color resolution prism systems of various constructions, but the prism system of the present invention has never been disclosed before.

SUMMARY OF THE INVENTION

The object of the present invention is, therefore, to provide a television camera provided with a color resolution prism system of a novel construction. According to said novel construction it is rendered possible not only to employ a glass of a refractive index in the order of 1.5 as the prism blocks but also to use a glass of a refractive index in the order of 1.9 without color shading resulting from the bias light.

DESCRIPTION OF THE PREFERRED EMBODIMENT

Figure 1:
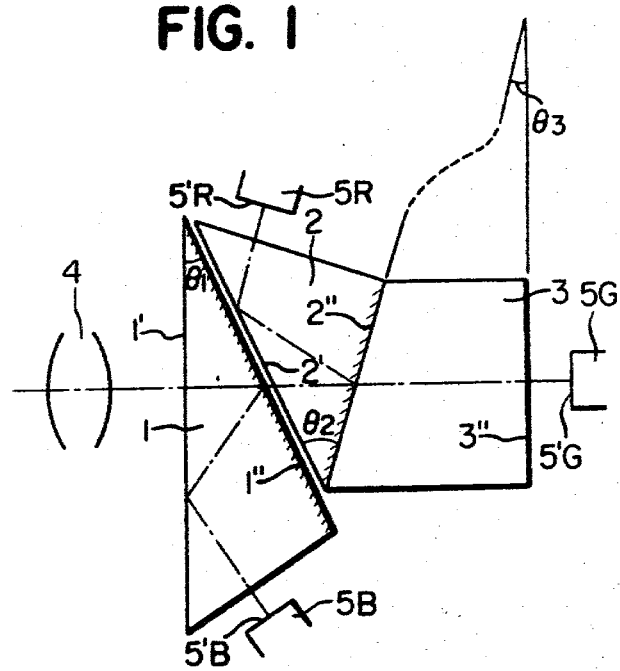
FIG. 1 is a schematic view of a conventional color resolution prism system.

In FIG. 1 there is shown an example of a commonly used color resolution prism system utilizing three prisms.

An image forming beam emerging from an objective lens 4 enters a first prism 1 through a light entrance face 1' of the color resolution prism system and is subjected, on a face 1" having a dichroic coating, to the reflection for example of a blue light component, which is totally reflected again on said entrance face 1' and focused on an image pick-up surface 5B' of an image pick-up device 5B. The beam passing through said dichroic face 1" enters a second prism 2 and is subjected, on a face 2" having dichroic coating, to the reflection for example of a red light component, which is totally reflected again on a boundary face 2' between the prism 2 and a parallel air gap between said first and second prisms and focused on an image pick-up surface 5R' of an image pick-up device 5R. The beam for example of green light component passing through the dichroic face 2' is focused on an image pick-up surface of an image take-up device 5G through a prism 3.

The shape of the above-mentioned prism system is determined by the refractive index n of the glass to be employed and the minimum F-number of the imaging lens applicable to the prism in the following manner.

The angles $\theta_1$ and $\theta_2$ between the entrance face and the dichroic face respectively of the first and second prisms, and the angle $\theta_3$ between the entrance face 2" and the exit face 3" of the third prism as shown in FIG. 1 are determined so as to satisfy the following conditions:

$$\theta_1 < \sin^{-1}(1/n) - \sin^{-1}(1/2nF) \quad (1)$$

$$2\theta_1 > \sin^{-1}(1/n) + \sin^{-1}(1/2nF) \quad (2)$$

$$2\theta_2 > \theta_1 + \sin^{-1}(1/n) + \sin^{-1}(1/2nF) \quad (3)$$

$$\theta_3 = \theta_2 - \theta_1 \quad (4)$$

wherein the condition (1) defining that the light components which should pass through the dichroic face 1" are not subjected to a total reflection thereon, the condition (2) defining that the light component reflected by said dichroic face 1" is to be totally reflected on the face 1', the condition (3) defining that the light component reflected by the dichroic face 2" is to be totally reflected on the face 2', and the condition (4) defining that the entrance face 1' is parallel to the exit face 3".

Also, as it is generally required to shorten the light path length in the prism system, the angles $\theta_1$ and $\theta_2$ are usually selected as small as possible within the ranges allowed by the above-mentioned conditions.

In the following there will be explained the principle of bias lighting, while making reference to FIGS. 2A–C.

For introducing a bias light there are provided recessed portions 6, 6' outside the effective image forming beam on the front face of the prism and said recess 6 is illuminated by a light source 7, whereby a portion of the light beam passing through said recess 6 directly illuminates the image pick-up surface 5' of the image pick-up device 5 while another portion of said light beam illuminates said image pick-up surface 5' after being reflected on another recess 6'. The reflected light from said recess 6' is required for compensating the unevenness in the illumination resulting from the direct light from the recess 6. Said recesses 6, 6' are provided with a diffusing surface or a mirror surface in order to achieve uniform illumination and to improve the efficiency thereof.

Figure 3:
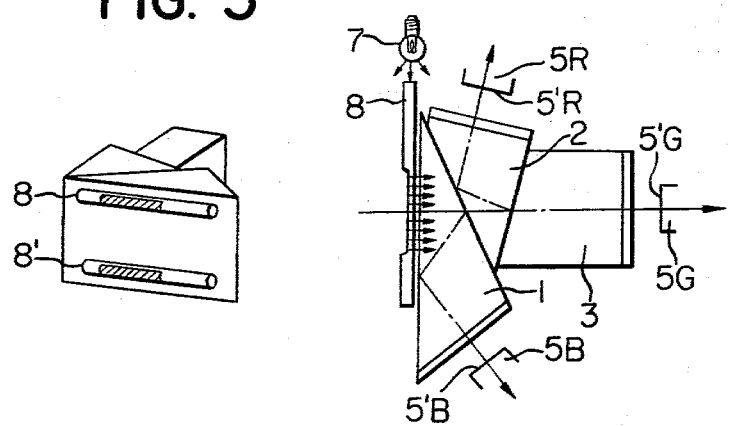
FIG. 3 is a schematic view of another bias light device.

Also said recesses may be replaced by two clad rods 8, 8' which are provided in front of the prism system and in positions not hindering the effective image forming beam as shown in FIG. 3 and which are partly notched to emit bias illumination therethrough.

The bias light introduced in the above-mentioned manner is separated into the color components by the dichroic faces provided in the prism system and illuminates uniformly the image pick-up surfaces 5B', 5G' and 5R'.

It is to be understood that the structure of the prism system and the method of bias lighting explained in the foregoing have been developed for optical glasses of a refractive index in the order of 1.5, for example BK7.

Figure 2A:
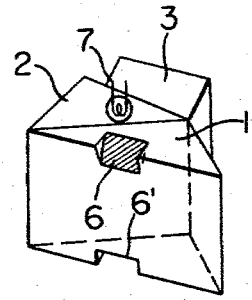
FIGS. 2A–C are schematic views of a bias light device.
Figure 2B:
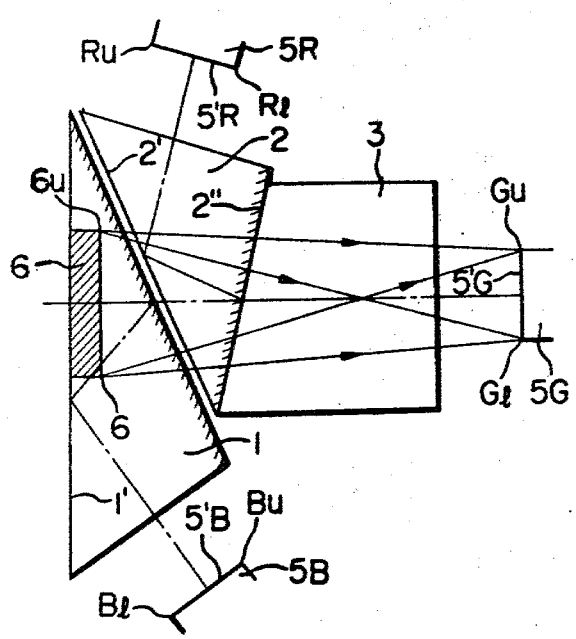
Figure 2C:
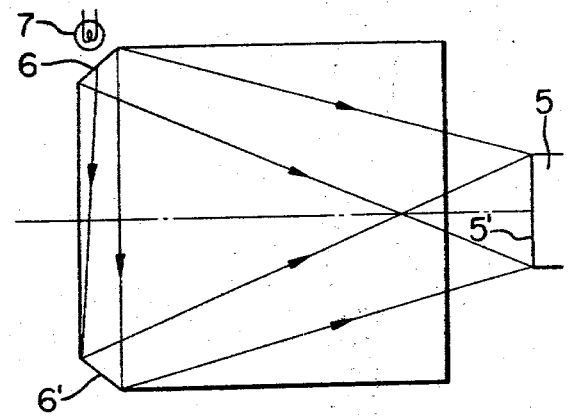
Figure 4A:
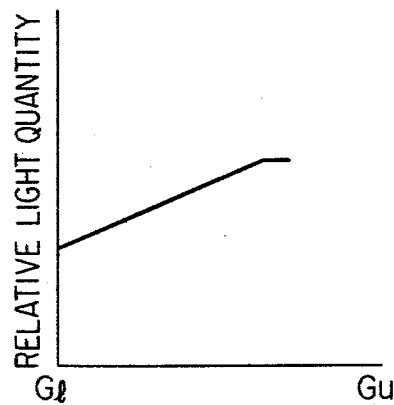
FIGS. 4A–C and 5A and 5B are views for explaining the color shading resulting from the bias light.
Figure 4B:
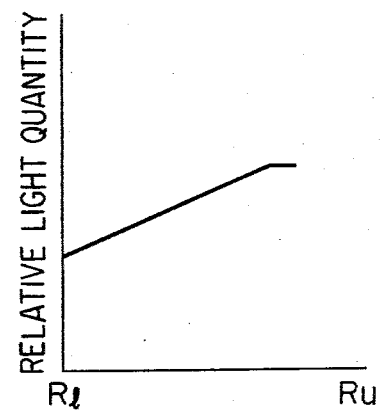
Figure 4C:
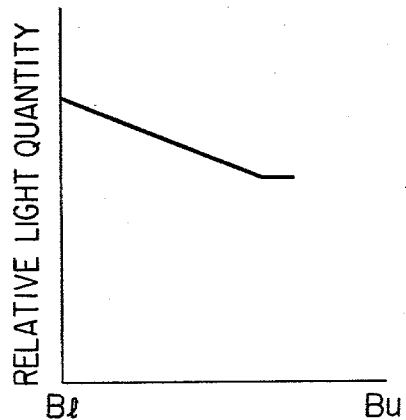

Although the use of so-called high index prisms made of a glass of higher refractive index than 1.6 has recently been investigated to cope with the demand for a smaller, lighter and better optical system, the smaller critical angle of such higher refractive glass results in, in the conventional prism system utilizing three prisms as shown in FIGS. 2A–C, a total reflection of a part of the bias light on the dichroic face 1" due to the contact thereof with an air gap, thereby causing a partial loss of the bias light to be directed to the image pick-up surfaces 5G' and 5R' of the image pick-up devices 5G and 5R and thus inducing so-called shading of bias light resulting from uneven illumination on the image pick-up surfaces. This will be understood if the distribution of bias illumination for example on the image take-up surface 5G' is considered. In FIG. 2B the point Gu can receive the bias light from the entire length of recess 6 as the bias light in this case enters the dichroic face 1" with a small incident angle and does not, therefore, cause total reflection thereon. On the other hand, though the bias light from the point 6l reaches the point Gl as it enters the dichroic face 1" with a small incident angle not causing a total reflection thereon but the bias light from the point 6u does not reach said point Gl because of the total reflection on said surface 1" as said bias light enters said surface 1" with an incident angle exceeding the critical angle thereof. Consequently the point Gl becomes less illuminated than the point Gu, with a distribution of relative light quantity on the image take-up surface 5G' as shown in FIG. 4A. Also the distribution of relative light quantity on the image pick-up surface 5R' becomes as shown in FIG. 4B for a similar reason, but the relative light quantity on the image pick-up surface 5B' has an inverted distribution as shown in FIG. 4C as the point Bl is more illuminated than the point Bu because of the bias light being totally reflected on the dichroic face 1".

The phenomenon as explained in the foregoing is also observable even with a glass of an ordinary refractive index if the prism system is designed smaller.

Such shading of the bias light significantly deteriorates the quality of reproduced television image and has therefore to be eliminated by an appropriate measure.

However, in a prism system utilizing three prisms as explained in the foregoing, it is evidently not possible to eliminate such shading of bias light as the shapes of prisms are determined by the aforementioned conditions (1) to (4) according to the F-number to be employed.

In the following there will be given an explanation on the condition for preventing the total reflection of bias light in the prism system while making reference to FIG. 5, said condition being required for deriving the conditional equation to be explained later.

Figure 5A:
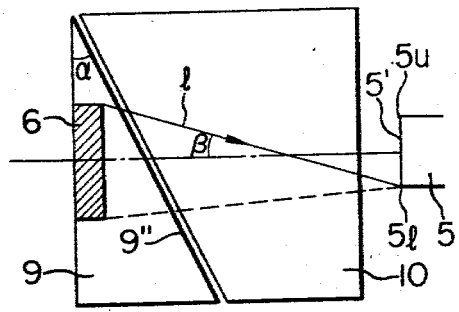
Figure 5B:
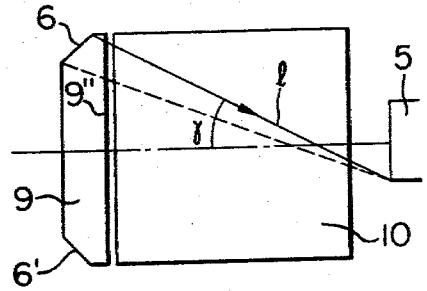

In FIGS. 5A and B there is shown a prism system composed, for the purpose of clarity, of only two prisms 9 and 10 separated by an air gap in a bottom view (A) and a cross-sectional view (B), wherein 6, 6" are recessed portions for introducing the bias light, 5 is an image pick-up device and 5' is an image pick-up surface thereof, $\alpha$ is the angle between the boundary face 9" of the prism 9 facing said air gap and a plane perpendicular to the optical axis $\beta$ is the angle formed in FIG. 5A, i.e., in a plane perpendicular to the edge of the prism, between a light beam 1 having a maximum incident angle to the face 9" and the optical axis, and $\gamma$ is the angle between said light beam 1 and the optical axis in FIG. 5B, i.e. in a plane parallel to the edge of the prism, said angles $\beta$ and $\gamma$ having the same meaning in the following example.

In order that the bias light is not totally reflected on the face 9", there should be satisfied the following condition:

$$\cos^{-1}\left(\frac{\cos(\alpha - \beta)}{\sqrt{1 - \cos^2\beta \tan^2\gamma}}\right) < \sin^{-1}(1/n) \quad (5)$$

In the following there will be shown an example that the shading of the bias lighting is unavoidable in a prism system employing three prisms.

For a refractive index of 1.7, and F-number of 1.4, an optical path length of 32 mm and a frame size of 6.6×8.8 mm, the prism angles $\theta 1$, $\theta 2$ and $\theta 3$ defined in FIG. 1 are:

$\theta 1 = 24°$ $\theta 2 = 36.5°$ $\theta 3 = 12.5°$.

If the bias light is introduced in such prism system with the method shown in FIG. 2, the maximum incident angles of the bias light to the dichroic face 1" are:

$\beta = 12°$ $\gamma = 25.5°$.

Since $\alpha = \theta 1 = 24°$, the left-hand term and the right-hand term of the condition (5) respective become 42.8° and 34.85°, indicating the presence of a total reflection of the bias light on the dichroic face 1", causing a shading.

Figure 6:
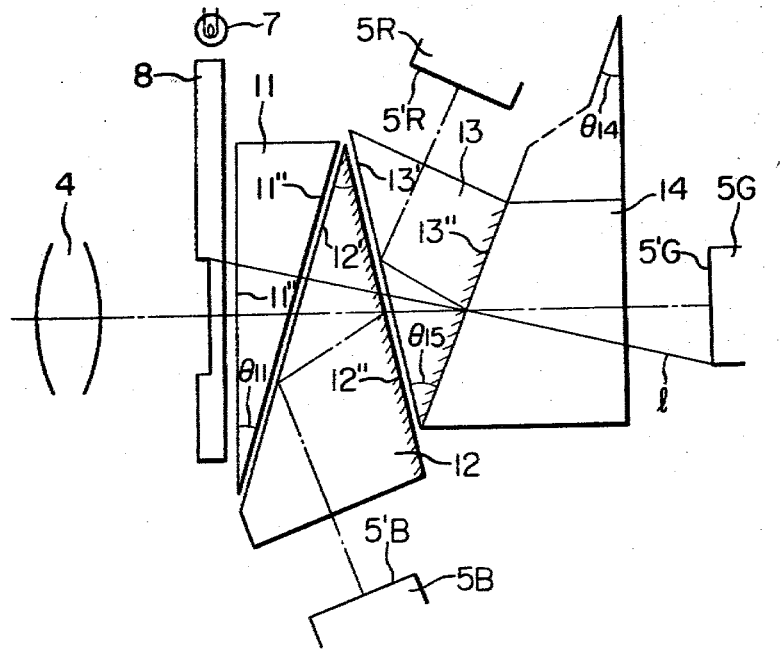
FIG. 6 is a view of the prism system embodying the present invention.

The present invention is featured by the use of a color resolution prism system comprising four prisms, wherein air gaps are provided between the first and second prisms and between the second and third prisms, said prisms having prism angles $\theta 11$, $\theta 12$, $\theta 13$ and $\theta 14$ respectively in the following ranges when said prisms are composed of a high-refracting glass of a refractive index in excess of 1.6:

$5° \leq \theta 11 \leq 20°$ $30° \leq \theta 12 \leq 35.8°$ $31.5° \leq \theta 13 \leq 40°$ $15° \leq \theta 14 \leq 18.2°$ In the following the present invention will be explained by an embodiment thereof shown in FIG. 6, wherein the prisms 11, 12 and 13 are mutually separated by air gaps, said prisms 12 and 13 being provided respectively with dichroic coatings. The bias lighting is provided in the above-explained manner by clad rods 8 located in positions not hindering the effective image forming light beam from a lens 4.

The image forming beam emerging from the objective lens 4 enters the prism 11 through an entrance face 11' of the color resolution prism system, and then enters the second prism 12 through an air gap. Said second prism 12 reflects a determined color component, for example blue component by the dichroic face 12" and transmits other color components. The blue light component reflected by said dichroic face 12" is again totally reflected by a boundary face 12' with the air gap and reaches an image pick-up surface 5B' of the image pick-up device 5B. On the other hand the beam transmitted by the dichroic face 12" enters, through the air gap, the third prism 13, wherein for example the red light component is reflected by a dichroic face 13", again totally reflected on a boundary face 13' with the air gap and reaches an image pick-up surface 5R' of the image pick-up device 5R. The beam transmitted by the dichroic face 13", namely for example green light component passes through the fourth prism 14 and reaches an image pick-up surface 5G' of the image take-up device 5G.

In the above-explained structure, the angles $\theta 11$, $\theta 12$, $\theta 13$ and $\theta 14$ of said prisms should be selected so as to satisfy the following conditions:

$$\cos^{-1}\left(\frac{\cos(\phi 11 + \beta)}{\sqrt{1 - \cos^2\beta \tan^2\gamma}}\right) < \sin^{-1}(1/n) \quad (6)$$

$$\cos^{-1}\left(\frac{\cos(\phi 12 - \phi 11 + \beta)}{\sqrt{1 - \cos^2\beta \tan^2\gamma}}\right) < \sin^{-1}(1/n) \quad (7)$$

$$2\phi 12 > \phi 11 + \sin^{-1}(1/n) + \sin^{-1}(\tfrac{1}{2}nF) \quad (8)$$

$$2\phi 13 > \phi 12 - \phi 11 + \sin^{-1}(1/n) + \sin^{-1}(1/8\,nF) \quad (9)$$

$$\phi 14 = \phi 11 - \phi + \phi 13 \quad (10)$$

wherein said condition (6) defining that the bias light is not totally reflected by the boundary face 11" between the prism 11 and the air gap, the condition (7) defining that the bias light of a color component to be transmitted by the dichroic face 12" is not totally reflected thereon, the condition (8) defining that the effective image forming beam reflected by the dichroic face 12" is to be totally reflected by the face 12', the condition (9) defining that the effective image forming beam reflected by the dichroic face 13" is to be totally reflected by the face 12', and the condition (10) defining that the entrance face 11' is parallel to the exit face 14'".

By selecting the prism angles according to the foregoing conditions (6) to (10) it is rendered possible to obtain a color resolution prism system capable of achieving a desired F-number and performing a satisfactory bias illumination without causing total reflection of the bias light on the boundary face between a prism and an air gap.

In the following shown are numerical examples of a designing of the present invention satisfying the above-explained conditions:

|  | Numerical Examples | | |
|---|---|---|---|
|  | 1 | 2 | 3 |
| Refractive index | 1.75 | 1.7 | 1.6 |
| F-number | 1.4 | 1.4 | 1.4 |
| Image frame size | 4.8 × 6.4 mm | 6.6 × 8.8 mm | 4.8 × 6.4 mm |
| Light path length | 30 mm | 32 mm | 35 mm |
| Bias lighting by | recesses on prism | clad rods | clad rods |
| Effective length of bias lighting means | 5 mm | 10 mm | 10 mm |

The example 1 employs the bias lighting by the recesses portions of a length of 5 mm provided on the front face of the prism as shown in FIGS. 2A–C, while the examples 2 and 3 employ the clad rods provided with notched portions respectively 5 and 10 mm long in the manner as shown in FIG. 3.

In these examples, however, the bias lighting can be achieved either by such recessed portions provided on the prism or by the clad rods, with an effective lighting length in a range of 5 to 20 mm, and the image size is obtainable within a range from 4.8×6.4 to 6.6×8.8 mm.

In the above-mentioned examples the angles $\beta$, $\gamma$ between the bias light of maximum incident angle to the faces 11", 12" and the optical axis are as follows:

|  | Numerical Examples | | |
|---|---|---|---|
|  | 1 | 2 | 3 |
| $\beta$ | 7° | 11° | 14.5° |
| $\Gamma$ | 22° | 23° | 20° |

Also the prism angles $\theta 11$, $\theta 12$, $\theta 13$ and $\theta 14$ can be selected as shown in the following table from the above-mentioned specifications and the aforementioned conditions (6) to (10):

|  | Numerical Examples | | |
|---|---|---|---|
|  | 1 | 2 | 3 |
| $\theta 11$ | 14° | 16° | 20° |
| $\theta 12$ | 30.0° | 32.1° | 35.8° |
| $\theta 13$ | 31.5° | 32.2° | 34° |
| $\theta 14$ | 15.2° | 16.1° | 18.2° |

The color resolution prism system of the present invention, being principally characterized in the structure thereof, is also applicable to a glass of a lower refractive index, as exemplified by the following data.

| Numerical Example 4 | |
|---|---|
| Refractive index | 1.52 |
| F-number | 1.4 |
| Image frame size | 6.6 × 8.8 mm |
| Optical path length | 36 mm |
| Bias lighting by | clad rods |
| Effective bias lighting length | 10 mm |
| $\beta$ | 10.5° |
| $\Gamma$ | 22° |
| $\theta 11$ | 5° |
| $\theta 12$ | 30° |
| $\theta 13$ | 40° |
| $\theta 14$ | 15° |

As detailedly explained in the foregoing, the present invention is to provide a television camera provided with a color resolution prism system having bias lighting means, said prism system comprising four prisms or prism angles respectively selected within the following ranges:

$5° \leq \theta 11 \leq 20°$ $30° \leq \theta 12 \leq 35.8°$ $31.5° \leq \theta 13 \leq 40°$ $15° \leq \theta 14 \leq 18.2°$, and air gaps being provided between said first and second prisms and between second and third prisms, thereby preventing the deterioration of the quality of television image resulting from the shading of bias illumination inherent to the conventional prism systems.

What we claim is:
1. A television camera, comprising:
   an objective lens;
   a color resolution prism system positioned behind said objective lens, said color resolution prism system comprising first, second, third and fourth prisms arranged in this order from the side of said objective lens along the optical axis thereof, said first and second prisms being mutually separated by an air gap, said second and third prisms being mutually separated by an air gap, said second prism provided with a first dichroic coating on a face thereof facing said third prism, and said third and fourth prisms being mutually adhered through a second dichroic coating;

bias light introducing means disposed between said objective lens and a face of said first prism that faces said objective lens, at such a position that does not interfere with the image light which has passed through said objective lens; and plural image pick-up devices respectively facing the exit faces of said color resolution prism system, wherein the following inequalities are satisfied:

$$\cos^{-1}\left(\frac{\cos(\theta 11 + \beta)}{\sqrt{1 - \cos^2 \beta \tan^2 \gamma}}\right) < \sin^{-1}(1/n)$$

$$\cos^{-1}\left(\frac{\cos(\theta 12 - \theta 11 + \beta)}{\sqrt{1 - \cos^2 \beta \tan^2 \gamma}}\right) < \sin^{-1}1/n)$$

$$2\theta 12 > \theta 11 + \sin^{-1}(1/n) + \sin^{-1}(1/2nF)$$
$$2\theta 13 > \theta 12 - \theta 11 + \sin^{-1}(1/n) + \sin^{-1}(1/nF)$$
$$\theta 14 = \theta 11 - \theta 12 + \theta 13$$

where,
$\theta 11$: a prism angle of said first prism,
$\theta 12$: a prism angle of said second prism,
$\theta 13$: a prism angle of said third prism,
$\theta 14$: a prism angle of said fourth prism,
$\beta$: an angle formed between the optical axis of the objective lens and the bias light having the maximum incident angle to said image pick-up device in a plane perpendicular to the edge line of the prism
$\gamma$: an angle formed between the optical axis of the objective lens and the bias light having the maximum incident angle to said image pick-up device in a plane parallel to the edge line of the prism,
F: the minimum f-number applicable with the prism
n: the refractive index of the prism.

* * * * *

UNITED STATES PATENT AND TRADEMARK OFFICE
CERTIFICATE OF CORRECTION

PATENT NO. : 4,236,177
DATED : November 25, 1980
INVENTOR(S) : SHIGERU OHSHIMA, ET AL.

It is certified that error appears in the above-identified patent and that said Letters Patent are hereby corrected as shown below:

Col. 5, line 23, change "$\sin^-(178nF)$" to --$\sin^{-1}(1/2nF)$;

line 24, after "$\phi$" (third occurrence) insert --12--.

Col. 8, line 4, change "$^{-1}1/n)$" to --$^{-1}(1/n)$--;

line 5, change "$\sin^{31}{}^1(1/n)$ to --$\sin^{-1}(1/n)$--.

Signed and Sealed this

Seventeenth Day of March 1981

[SEAL]

Attest:

RENE D. TEGTMEYER

Attesting Officer        Acting Commissioner of Patents and Trademarks